United States Patent [19]
Gurol et al.

[11] Patent Number: 5,755,977
[45] Date of Patent: May 26, 1998

[54] CONTINUOUS CATALYTIC OXIDATION PROCESS

[75] Inventors: Mirat D. Gurol, Philadelphia, Pa.; Shu-Sung Lin, Ping-Tung, Taiwan

[73] Assignee: Drexel University, Philadelphia, Pa.

[21] Appl. No.: 675,197

[22] Filed: Jul. 3, 1996

[51] Int. Cl.$^6$ .................................................. C02F 1/72
[52] U.S. Cl. .......................... 210/759; 210/760; 210/762; 210/763
[58] Field of Search .................................. 210/759, 760, 210/762, 763

[56] References Cited

PUBLICATIONS

Gurol et al., "Heterogeneous Catalytic Oxidation Using Hydrogen Peroxide or Ozone with Iron Oxide Particles," 2nd Intl. Symp. Advanced Oxidation Technologies, San Francisco, CA, p. 79, (Feb. 28, 1996).

Gurol et al., "Granular Iron Oxide as a Catalyst in Chemical Oxidation of Organic Contaminants," Emerging Technologies in Hazardous Waste Treatment, Atlanta, GA, pp. 1–15 (Sep. 20, 1995).

Bhat et al., "Oxidation of Chlorobenzene by Ozone and Heterogeneous Catalytic Ozonation," Mid Atlantic Waste Conf., pp. 371–382 (Jul. 9, 1995).

Lin et al., "Investigation of $H_2O_2$ Catalysis with Iron Oxide for Removal of Synthetic Organic Compounds," Mid Atlantic Waste Conf., pp. 352–360 (Jul. 9, 1995).

Ravikumar et al., "Chemical Oxidation of Chlorinated Organics by Hydrogen Peroxide in the Presence of Sand," Environ. Sci. Tech., 28, pp. 394–400 (1994).

Drago et al., "Deep Oxidation of Chlorinated Hydrocarbons," Environmental Catalysis, American Chemical Society, Washington, DC, pp. 340–352 (1994).

Wang et al., "Hydrogen Peroxide Decomposition Kinetics in the Presence of Iron Oxides," Third Internatinal Symposium: Chemical Oxidation Technology for the Nineties, Nashville, TN, pp. 74–79 (1993).

Watts et al., "Use of Iron Minerals in Optimizing the Peroxide Treatment of Contaminated Soils," Water Environ. Res., 65, pp. 839–844 (1993).

Allemane et al., "Comparative Efficiency of Three Systems ($O_3$, $O_3/H_2O_2$ and $O_2/TiO_2$) for the Oxidation of Natural Organic Matter in Water," Ozone Sci. & Eng., 15, pp. 419–432 (1993).

Akata et al., "Oxidation of Nitrobenzene by Ozone and Ozone/UV Processes," Chemical Oxidation: Technology for the Nineties, 2, Roth, ed., Technomic Publ. Co., Lancaster, PA, pp. 140–160 (1993).

Flaherty et al., "Continuous Flow Applications of Fenton's Reagent for the Treatment of Refractory Waste Waters," Second International Symposium: Chemical Oxidation Technology for the Nineties, Nashville, TN, pp. 58–73 (1992).

Munz et al., "Oxidative Treatment of Process Water in a Soil Decontamination Plant: I. Laboratory Studies," Proceedings to the Second International Symposium: Chemical Oxidation Technology for the Nineties, Nashville, TN, pp. 247–263 (1992).

Sedlak et al., "Oxidation of Chlorobenzene with Fenton's Reagent," Environ. Sci. Tech., 25, pp. 777–782 (1991).

Tyre et al., "Treatment of Four Biorefractory Contaminants in Soils Using Catalyzed Hydrogen Peroxide," J. Environ. Qual., 20, pp. 832 (1981).

Bowers et al., Treatment of Toxic or Refractory Waste Waters with Hydrogen Peroxide, Water Sci. Tech., 21, pp. 477–486 (1989).

Al–Hayek et al., "Ozonation Catalytique ($FeIII/Al_2O_3$) du phénol et de ses produits d'ozonation," Environ. Technol. Letters, 10, pp. 415–426 (1989).

Munter et al., "Catalytic Treatment of Waste Water with Ozone," Khimiya i Teknologiya Vody, 7(6), pp. 17–19 (1985) (English translation).

Staehelin et al., "Decomposition of Ozone in Water in the Presence of Organic Solutes Acting as Promoters and Inhibitors of Radical Chain Reactions," Environ. Sci. Technol., 19, pp. 1206–1213 (1985).

Walling, "Fenton's Reagent Revisited," Accounts of Chemical Research, 8, pp. 125–131 (1975).

Primary Examiner—Neil McCarthy
Attorney, Agent, or Firm—Panitch Schwarze Jacobs & Nadel, P.C.

[57] ABSTRACT

A contaminated fluid such as water or a gas stream containing at least one organic contaminant is contacted in a continuous process with a particulate geothite catalyst in a reactor in the presence of hydrogen peroxide or ozone or both to decompose the organic contaminants.

19 Claims, No Drawings

1

CONTINUOUS CATALYTIC OXIDATION PROCESS

REFERENCE TO U.S. GOVERNMENT SUPPORT

This invention was made with Government support under Grant No. BES9407724 awarded by the National Science Foundation. The Government has certain rights in this invention.

FIELD OF THE INVENTION

This invention relates to a continuous catalytic oxidation process that uses a solid catalyst to treat organic contaminants present in gas streams or aqueous media.

BACKGROUND OF THE INVENTION

Water and air contaminated with organic chemicals continue to be a concern to the general public and to environmental regulatory authorities. The presence in water of hazardous organic compounds, particularly low levels of chlorinated hydrocarbons, requires treatment to remove such compounds to upgrade the water to drinking quality suitable for human consumption. Likewise, the presence of chlorinated hydrocarbons at low levels in waste gas streams, e.g., exhaust gases from small business operations, is a continuing source of air pollution in many areas. Water or air contaminated with organic compounds may be treated with activated carbon to remove such contaminants, but this treatment merely removes the contaminants and does not convert or decompose them into innocuous substances and further treatment of the adsorbed contaminants is still required. High temperature incineration is well known to be capable of decomposing hazardous organic substances into harmless byproducts, but such treatments are extremely costly.

In the treatment of waters contaminated with organic compounds, ozone and hydrogen peroxides are chemical oxidants that have been used to remove easily oxidizable organic compounds, e.g., phenols and cyanides, from contaminated water. Many organic compounds, however, that are serious contaminants are highly resistant to oxidation by hydrogen peroxide or ozone. For example, ozone is an effective oxidant but is selective in its reactivity with certain organic compounds, e.g., it does not react well with chlorinated aliphatics and aromatics. Likewise, hydrogen peroxide is generally a poor oxidant for the majority of organic compounds that are often present in contaminated water or air streams.

One treatment for producing a strong oxidant for reacting with solubilized organic compounds is the catalyzed decomposition of hydrogen peroxide using Fenton's reagent, which is an acidic solution (pH of about 2–4) of water-soluble ferrous salts, e.g., ferrous sulfate, with hydrogen peroxide; see, e.g., Flaherty et al., "Continuous Flow Applications of Fenton's Reagent for the Treatment of Refractory Waste Waters" in *Second International Symposium: Chemical Oxidation Technology for the Nineties*, Nashville, Tenn., pp. 58–73 (1992); Munz et al., "Oxidative Treatment of Process Water in a Soil Decontamination Plant: I. Laboratory Studies" in *Proceedings to the Second International Symposium: Chemical Oxidation Technology for the Nineties*, Nashville, Tenn., pp. 247–263 (1992); Sedlak et al., "Oxidation of Chlorobenzene with Fenton's Reagent," *Environ. Sci. Tech.*, 25, pp. 777–782 (1991); Bowers et al., "Treatment of Toxic or Refractory Waste Waters with Hydrogen Peroxide" in *Water Sci. Tech.*, 21, pp. 477–486 (1989); and Walling, "Fenton's Reagent Revisited", *Accounts of Chemical Research*, 8, pp. 125–131 (1975). In addition to the drawback of requiring highly acid pH reaction conditions, Fenton's reagent also forms large quantities of sludge, i.e., colloidal precipitates of $Fe(OH)_3$ in the reaction mixtures, that make its separation from the treated water and its ultimate disposal difficult and expensive.

A few recent studies involving batch-wise laboratory reactions of hydrogen peroxide in the presence of iron oxide have suggested the use of such a reaction in the in situ treatment of contaminated soils and ground water; see, e.g., Ravikumar et al., "Chemical Oxidation of Chlorinated Organics by Hydrogen Peroxide in the Presence of Sand" in *Environ. Sci. Tech.*, 28, pp. 394–400 (1994); Wang et al., "Hydrogen Peroxide Decomposition Kinetics in the Presence of Iron Oxides", *Third International Symposium: Chemical Oxidation Technology for the Nineties*, Nashville, Tenn., pp. 74–79 (1993); and Watts et al., "Use of Iron Minerals in Optimizing the Peroxide Treatment of Contaminated Soils" in *Water Environ. Res.*, 65, pp. 839–844 (1993).

The use of ozone in the presence of a titanium dioxide ($TiO_2$) catalyst has been described for the oxidation of natural organic matter in water; see, e.g., Allemane et al., "Comparative Efficiency of Three Systems ($O_3$, $O_3/H_2O_2$ and $O_3/TiO_2$) for the Oxidation of Natural Organic Matter in Water," *Ozone Sci. & Eng.*, 15, pp. 419–432 (1993).

The present invention addresses a need for a method capable of treating contaminated air and water at ambient temperature to remove and decompose, in a single treatment, organic compounds that are present as contaminants.

SUMMARY OF THE INVENTION

According to the present invention, a contaminated fluid is treated by a process of continuously introducing a fluid containing at least one organic contaminant into a reactor, contacting the fluid in the reactor with a particulate mineral oxide catalyst selected from the group consisting of iron oxide and manganese oxide, in the presence of an oxidizing agent selected from the group consisting of hydrogen peroxide and ozone, for a period of time sufficient to decompose at least part of said organic contaminant, and continuously withdrawing an effluent stream of treated fluid, wherein said period of contact time of the fluid in the reactor is sufficient to reduce the amount of organic contaminant by at least half in the effluent stream.

In a preferred embodiment of the invention, the particulate mineral oxide catalyst is goethite. The particulate goethite catalyst may have a median particle size in the range of about 10 microns to about 5 millimeters.

The process of this invention is particularly versatile, being suitable for the continuous flow treatment of contaminated fluids that are either gas streams or aqueous liquid media like water. The catalytic oxidation process of this invention is useful for treating water or gas streams containing one or more contaminants that are chlorinated alkanes, chlorinated alkenes, alkanes, alkenes, aromatics, ketones, alcohols, carboxylic acids, amines, ethers, or the like.

DESCRIPTION OF THE PREFERRED EMBODIMENTS

The continuous flow catalytic oxidation process of this invention utilizes a mineral oxide catalyst in particulate form, for effecting heterogeneous catalytic oxidation. The process of this invention involves a heterogeneous catalysis reaction, i.e., a catalytic reaction in which the catalyst is one phase, i.e., a solid phase, and the medium being treated is a different phase, e.g., a gas stream or aqueous medium. The use of the particulate mineral oxide catalyst in a heterogeneous catalysis oxidation provides efficient performance over extended periods of operation, in contrast to use of a homogenous catalysis reaction, i.e., in which catalyst and the medium being treated are a single phase, e.g., a solubilized catalyst used to treat an aqueous medium, where the catalyst must be continually renewed.

The term "particulate" as used in this disclosure is intended to mean particulates, including agglomerates or aggregates, whose mean size is at least about 10 microns in size, preferably at least about 50 microns in size. The term "size" means diameter in the case of particles that are approximately spherical or, for non-spherical particles, the largest dimension. Larger size particulates are often described as granular, and the term "granular" as used in this specification is intended to mean particle (including agglomerates or aggregate), whose mean particle size is at least about 150 microns. The maximum size of the particulate mineral oxide catalyst may be as large as 1 centimeter or larger but is preferably less than about 5 millimeters in size. Since the catalytic activity of the particulate mineral oxide catalyst is a direct function of its available surface area, a mean particle size of less than about 5 millimeters is preferred to provide good catalyst efficiencies per unit volume of packed particulate catalyst. The particulate mineral oxide catalyst preferably has a median particle size within the range of at least about 100 microns up to about 3 millimeters in size.

The mineral oxide catalyst may be selected from iron oxide, manganese oxide, mixtures of iron oxide and manganese oxide, and mixtures containing these mineral oxides, and the like. Iron (III) oxide is the preferred mineral oxide catalyst, and goethite (alpha-FeOOH or α-FeOOH) is most preferred as the mineral oxide catalyst. Other iron (III) oxide catalysts include lepidocrocite (γ-FeOOH), hematite (α-$Fe_2O_3$), limonite (FeO(OH)·n$H_2O$), magnetite ($Fe_3O_4$), and other forms of ferric oxide and ferric hydroxide oxide. Goethite is the preferred mineral oxide catalyst since its reaction with hydrogen peroxide as the oxidizing agent appears to be faster than that for lepidocrocite and even more so for iron (III) oxides such as hematite and magnetite.

Goethite may be utilized as the naturally occurring mineral, which is widely available and which may be crushed to a suitable particle size. Goethite may also be prepared synthetically, e.g., by aging a mixture of ferric nitrate and potassium hydroxide at elevated temperature.

Goethite is also the preferred mineral oxide catalyst for use in the process of this invention, since its catalytic oxidation-efficiency appears relatively independent of the concentrations of inorganic carbon, e.g., carbonate and bicarbonate ions, in the contaminated fluid being treated. Goethite is likewise preferred as the mineral oxide catalyst because of its low affinity for bromide adsorption on the iron oxide surface where oxidation takes place, thus minimizing the unwanted formation of bromate from bromide which may be present in the contaminated fluid. Goethite is further preferred as the mineral oxide catalyst in the process of this invention because of its long-term catalytic activity, enabling the mineral oxide catalyst to be used over extended periods without regeneration or replacement.

Manganese oxide may also be used as the mineral oxide catalyst and is preferably manganese dioxide ($MnO_2$).

The specific mineral oxide catalyst such as goethite may be used in substantially pure form or in a natural or synthetic mixture of mineral oxides or other components, e.g., a mixture which also contains goethite as a primary component. The mineral oxide catalyst may also be used in combination with other materials, e.g., granular activated carbon.

The particulate mineral oxide catalyst may also be prepared by coating a suitable particulate substrate, e.g., activated carbon in particulate form or an inorganic substrate such as alumina or clay in particulate form, with a coating of iron (III) oxide, preferably goethite, or other suitable mineral oxide. The particulate catalyst may alternatively be prepared by compacting the mineral oxide, e.g., goethite being preferred, into a particulate or granular form.

The particulate mineral oxide catalyst of this invention is preferably further characterized by being substantially insoluble in the contaminated aqueous medium being treated. This preferred relative insolubility of the mineral oxide catalyst in the aqueous medium being treated ensures longevity of the catalyst when used in the process of this invention. Such relative insolubility also ensures that the solid catalyst provides its intended function in the heterogeneous catalytic oxidation of the organic contaminants in the aqueous medium being treated. Goethite is particularly preferred as the iron oxide catalyst because of its substantial insolubility in aqueous media over a wide range of pH values.

Unlike prior art methods for treating contaminated fluids, the continuous catalytic oxidation process of this invention is also capable of removing metals that are likewise present in the contaminated fluid. Such metal contaminants, e.g., heavy metals, are adsorbed onto the surface of the particulate mineral oxide catalyst which is conditioned with the oxidizing agent, in the process of this invention, and the adsorbed metal contaminants are retained on or bound to the catalyst.

The particulate mineral oxide catalyst in the preferred particle size range is well suited for use in the process of this invention, since the granular or particulate form of the mineral oxide catalyst is readily separable from the effluent fluid stream, e.g., by gravity, sedimentation, filtration or the like, and recycled back to the reactor for further use. In reactors such as fixed bed reactors, the particulate or granular form minimizes entrainment of the catalyst in the treated effluent fluid stream, while ensuring that available surface area for catalytic oxidation of the contaminants is sufficiently large so as not to be a constraint on the catalytic oxidation reaction.

The oxidizing agent employed in the process of this invention is hydrogen peroxide or ozone or combinations of ozone with hydrogen peroxide. Hydrogen peroxide is preferred for treating contaminated aqueous media such as water. Ozone may be used to treat contaminated fluids that are either aqueous media or gas streams.

Hydrogen peroxide is preferably employed as a stabilized aqueous solution of hydrogen peroxide ($H_2O_2$), containing from about 1% to about 70% by weight $H_2O_2$ based on the weight of the aqueous hydrogen peroxide solution, more preferably containing from about 5% to about 35% by weight $H_2O_2$. The concentration of hydrogen peroxide in the aqueous hydrogen peroxide solution is not critical provided that the desired concentration of hydrogen peroxide in the contaminated fluid being treated is achieved, as described below.

The oxidizing agent utilized in this invention may also be ozone gas ($O_3$), used alone or in combination with hydrogen peroxide. Ozone may be generated from oxygen using commercially available ozone generators and may be generated from high purity oxygen or from oxygen in gas mixtures, e.g., air. The ozone concentration in the gas mixture is preferably less than about 10 vol %, more preferably within the range of from about 0.5 to about 5 vol % in the ozone-containing gas mixture. In addition to the ozone component, the gas mixture preferably contains oxygen.

A combination of aqueous hydrogen peroxide and ozone gas may also be used as the oxidizing agent in the process of this invention. Preferred combinations of ozone and hydrogen peroxide contain from about 1:10 to about 10:1 by weight of ozone to hydrogen peroxide, more preferably from about 1:5 to about 5:1 by weight hydrogen peroxide to ozone.

The amount of oxidizing agent introduced into the contaminated fluid may vary over wide ranges. The oxidizing agent, regardless of whether it is hydrogen peroxide or ozone or combinations of hydrogen peroxide and ozone, is introduced into the fluid being treated in an amount that preferably provides about at least one part oxidizing agent per part of organic contaminant present in the fluid being treated, such parts being parts by weight. References to parts or concentrations of the oxidizing agent refer to the hydrogen peroxide ($H_2O_2$) or ozone ($O_3$) per se. Alternatively and more preferably, the oxidizing agent is present in the contaminated fluid being treated in an amount that provides a molar excess of oxidizing agent, i.e., $H_2O$ or $O_3$ or both, with respect to the organic contaminant or contaminants contained in the contaminated fluid being treated.

The means by which the oxidizing agent is introduced into the reactor is not critical, provided that the oxidizing agent is present in the appropriate concentration in proximity to the catalyst, particularly the surface of the solid catalyst, to effect catalytic oxidation of the organic contaminant. In the case of the aqueous hydrogen peroxide oxidizing agent, the hydrogen peroxide may be mixed with the incoming fluid stream, typically an aqueous stream, or may be separately introduced into the reactor, preferably upstream of the catalyst. For ozone as the oxidizing agent, the point of introduction is again preferably upstream of where the contaminated fluid is contacted with the catalyst.

In most reactors, e.g., as plug flow and fluidized bed reactors, the oxidizing agent is preferably introduced at a point prior to the fluid becoming contacted with the catalyst. This ensures that the oxidizing agent is available at the appropriate concentration during catalytic oxidation of the contaminant by the solid catalyst.

The continuous catalytic oxidation process of this invention, when used to treat a contaminated aqueous fluid, may be operated over a fairly wide pH range. The pH of the aqueous medium may be in the range of from about 3 to about 11, preferably from about 5 to about 9, and most preferably being a substantially neutral pH of from about 6 to about 8. Because the process of this invention may be operated at a substantially neutral pH for the treatment of contaminated aqueous fluids (which are typically received for treatment at a substantially neutral pH), there is no added economic cost associated with pH adjustment, e.g., with an acid to acidify the contaminated aqueous fluid in order to provide for effective treatment and removal of the contaminants.

The continuous process of this invention may be operated at a wide range of temperatures but ambient temperatures are preferred. The catalytic oxidation provided by the particulate mineral oxide catalyst and oxidizing agent used in the continuous process of this invention is highly effective at ambient temperatures. The continuous catalytic oxidation process may therefore be operated at temperatures within the range of about 10° C. to about 50° C. or more and is more preferably operated at a temperature within the range of about 15° C. to about 40° C. Although the catalytic oxidation process of this invention can be operated at temperatures in excess of 50° C. with excellent results, such elevated temperatures are not ordinarily used unless the contaminated fluid being treated is already at such temperature when subjected to treatment according to the process of this invention. Because the continuous catalytic oxidation process of this invention is capable of being operated in a highly efficient manner at ambient temperatures or at the temperature of the contaminated fluid as received (if at an elevated temperature), the process of this invention did not incur an additional economic cost associated with heating the contaminated fluid in order to provide for effective removal of the contaminants. Likewise, high pressures are unnecessary for the process of this invention.

The period of time necessary to effect substantial decomposition and removal of the organic contaminant or contaminants in the fluid being treated, i.e., a reduction of at least about 50% (half) of the original amount in the untreated fluid, is normally relatively short. The treatment period in the reactor, typically measured as the average residence time or average contact time of the fluid in the reactor, is preferably less than about 1 hour, more preferably less than about 30 minutes and most preferably less than about 10 minutes. The reduction of organic contaminants in the treated effluent fluid withdrawn from the reactor, as compared with the amounts in the untreated contaminated fluid, is preferably at least about 80% and more preferably at least about 90%.

Decomposition of the organic contaminant or contaminants in the continuous catalytic oxidation process of this invention most preferably results in the complete mineralization of the organic compound or compounds, i.e., conversion of their total organic content to relatively innocuous by-products such as carbon dioxide and/or mineral salts such as chloride or nitrate salts. For organic contaminants that are complex or high molecular weight organic compounds, decomposition via the continuous catalytic oxidation process of this invention typically produces intermediate or daughter products from decomposition of the parent compound or compounds. However, such intermediate products are typically rapidly decomposed as well, resulting in substantially complete mineralization of all organic contaminants (both originally present and present as intermediate products or by-products), so further treatment of the effluent fluid stream is generally unnecessary.

The operating parameters for the continuous process of this invention are selected to reduce the amounts of organic contaminants in the treated fluid by at least about half, as compared with the original amounts present in the untreated contaminated fluid, more preferably by at least about 80% and most preferably by at least about 90%.

The continuous flow catalytic oxidation process of this invention is carried out in a suitable reactor. The reactor contains the particulate mineral oxide catalyst and is equipped with means for introducing the oxidizing agent and for introducing (on a continuous basis) the contaminated fluid being treated and for withdrawing or otherwise removing (also on a continuous basis) the fluid after the catalytic oxidation treatment.

The reactor utilized in the continuous flow process of this invention may be any of several types of equipment familiar to those skilled in the chemical process engineering art. Preferred reactors include continuous flow fixed bed columns, which are useful for the treatment of either aqueous fluid streams or gas streams, or fluidized or semifluidized bed reactors, which are useful for treating gas streams. Although column-type reactors are preferred, continuous stirred tank reactors may also be used for carrying out the continuous catalytic oxidation process of this invention.

The reactor may be either a single stage or multi-stage reactor. The reactor may also comprise two or more reactors connected, coupled or otherwise linked in series. Combinations of such reactors may also be employed in this invention, e.g., in the multi-stage treatment of a contaminated aqueous medium with hydrogen peroxide, the exhaust gas resulting from such treatment may be further treated in a separate reactor with ozone to remove residual organic contaminants that may be present in the exhaust gas stream.

The reactor may also be equipped with means for recirculating a portion of the treated fluid to effect more complete decomposition of the organic contaminant or contaminants present in the fluid being treated. The reactor may also be equipped with means for introducing the oxidizing agent at more than one point in the reactor, e.g., at individual stages within a multi-stage reactor.

Other vessels or containment systems besides those described above may also be used as the reactor for carrying out the heterogenous catalytic oxidation process of this invention, and such alternative reactors are intended to be within the scope of the invention. A common characteristic of the reactors suitable for use in the continuous process of this invention is that the reactor design provides for maintaining the particulate mineral oxide catalyst within the confines of the reactor, where the catalytic oxidation process is carried out with the oxidizing agent also being present. It is important to recognize that the catalytic oxidation process of this invention is carried in a continuous manner, rather than as a batch-wise reaction.

The design and operation of fixed and/or suspended bed reactors is well known to those skilled in the chemical process engineering art; the teachings of Y. T. Shah in "Gas-Liquid-Solid Reacted Design," McGraw Hill Publishing Company (1979) are exemplary of the state of the art. In a preferred mode of operation, fixed bed and suspended bed (fluidized or semi-fluidized bed) column-type reactors are preferably operated with the fluid flow being in an upflow direction, since gas accumulation within the bed is minimized and, for fluidized and semi-fluidized beds, the expansion of the bed provides continuous washing of the particulate mineral oxide catalyst and facilitates removal of precipitate that might otherwise be trapped within the catalyst bed, creating operational problems.

The continuous catalytic oxidation process of this invention is operated at conventional pressures typically employed with the conventional reactors employed, i.e., high pressure reactors and/or extremely high operating pressures are unnecessary.

Other operating parameters such as the residence or contact time of the fluid in the reactor, the catalyst amount or depth or concentration, and the dosage of the oxidizing agent are selected in accordance with the process specifications described earlier and in consideration of the quality and quantity of the fluid stream to be treated and the concentration and identity of the contaminant or contaminants to be decomposed and removed.

With respect to the treatment of aqueous streams, the catalytic oxidation process of this invention is relatively insensitive to the presence of particles, color, pH (acidity or alkalinity) of the aqueous stream being subjected to treatment.

The continuous catalytic oxidation process of this invention may be used to treat a variety of contaminants present in fluids. The contaminants are typically organic contaminants but, as noted earlier above, may also include metals such as arsenic, lead, copper, cadmium, nickel, zinc, mercury, selenium, chromium, and the like. The contaminated fluid may be an aqueous liquid medium such as water or a gas such as air. The contaminants are typically present in such fluids at low but problematic concentrations and typically mixtures of contaminants are present.

The organic contaminants may include chlorinated alkanes, chlorinated alkenes, alkanes, alkenes, aromatics, phenols, ketones, alcohols, carboxylic acids, amines, ethers, and the like. Examples of chlorinated alkanes include dichloromethane, trichloromethane (chloroform), tetrachloromethane (carbon tetrachloride), 1,2-dichloroethane, 1,1,1-trichloroethane, 1,1,2-trichloroethane, n-chlorobutane, chlorinated fluorocarbons such as Freon® 11, Freon® 12 and Freon® 113, and the like. Chlorinated alkenes may include trichloroethylene, perchloroethylene, 1,1-dichloroethylene, 1,2-dichloroethylene, 1,3-dichloropropene, and the like. Alkanes may include methane, ethane, butane, and the like. Alkenes may include ethene, butene, pentene, hexene, and the like. Aromatic contaminants may include benzene, nitrobenzene, toluene, 1,2-dichlorobenzene, 1,4-dichlorobenzene, xylene, and the like. Aromatic contaminants may also include phenol contaminants such as phenol, p-nitrophenol, pentachlorophenol, and the like. Ketone contaminants may include acetone, methylethylketone, and the like. Alcohol contaminants may include methanol, ethanol, other lower alkyl alcohols, and the like. Carboxylic acid contaminants may include oxalic acid, formic acid, acetic acid, and the like. Amine contaminants may include dimethyl amine, aniline, dimethylhydrazine, and the like. Ether contaminants may include methyl t-butyl ether, and the like.

More than one of such contaminants may be present in the contaminated fluid, and this is particularly the case with chlorinated low molecular weight hydrocarbons. For example, ground water may be contaminated with organic compounds that include trichloroethylene, perchloroethylene, carbon tetrachloride, 1,2-dichloroethylene, 1,2-dichloroethane and 1,1-dichloroethylene. In addition, as mentioned earlier, the organic contaminants may also include the presence of metals as additional contaminants.

The contaminants are typically present in contaminated aqueous media in amounts of less than 5 wt %, and the organic compounds are preferably present in amounts of less than 1 wt %, all based on the weight of the contaminated fluid. In contaminated gas streams, the contaminants are typically present in amounts of less than 1% by volume, and the organic contaminants are preferably present in amounts of less than 0.1% by volume and more preferably in amounts of less than 0.01% by volume, all based on the volume of the contaminated gas.

The continuous catalytic oxidation process is useful for treating contaminated aqueous media such as aqueous industrial waste streams, ground water, surface water, sea water, and the like. The process of this invention is especially suited for treating contaminated ground water such as well water. Other aqueous media contaminated with low levels of organic contaminants or pollutants, as well as heavy metal contaminants, are also suitable for treatment according to the continuous catalytic oxidation process of this invention. The organic contaminants may be natural organic compounds or synthesized organic compounds or by-products of natural or synthetic organic compounds.

The process of this invention is also well suited for treating contaminated waters also containing bromide ion, since the decomposition of the organic contaminant or contaminants via the continuous catalytic oxidation that is carried out in this invention does not result in formation of significant amounts of bromate ion, which is a suspected carcinogen and therefore undesirable in treated water.

The continuous catalytic oxidation process of this invention is particularly well suited for treating contaminated air streams such as air or gas streams exhausted or vented from dry cleaning establishments. Such exhaust gas streams typically contain low levels of chlorinated hydrocarbons used in dry cleaning establishments.

Other waste gas streams contaminated with organic compounds, such as methane-containing exhaust air from animal confinement habitats, may also be treated according to the process of this invention.

In the treatment of gas streams containing organic contaminants that are highly chlorinated volatile hydrocarbons, e.g., tetrachloromethane (carbon tetrachloride), oxidation efficiencies may be improved in the process of this invention by supplementing the oxidizing agent with a hydrogen source such as methane.

Without wishing to be bound by any particular theory or reaction mechanism, the inventors believe that the reaction mechanism of goethite as the mineral oxide catalyst with hydrogen peroxide as the oxidizing agent to decompose an organic contaminant proceeds as follows:

Hypothesized Reaction Mechanism for $H_2O_2/$ FeOOH Process

1. Precursor complex formation $$\equiv Fe^{III}OH + H_2O_2 \langle -----\rangle \equiv Fe^{III}-OH-H_2O_2$$

$$\equiv Fe^{III}OH + M \langle -----\rangle \equiv Fe^{III}-OH-M(\equiv M)$$

2. Electron transfer $$\equiv Fe^{III}-OH-H_2O_2 -----\rangle \equiv Fe^{II}-OH_2 + HO_2$$

3. Generation of hydroxyl radical $$\equiv Fe^{II}-OH_2 + H_2O_2 -----\rangle \equiv Fe^{III}-OH + .OH + H_2O$$

4. Oxidation of organic compound(s)

$$.OH + \equiv M -----\rangle \equiv M_{oxi}$$

$$HO_2^-/.O_2^- + \equiv M -----\rangle \equiv M^*_{oxi}$$

The corresponding reaction of goethite with ozone as the oxidizing agent to decompose an organic contaminant is believed to proceed by the following reaction mechanism:

Hypothesized Reaction Mechanism for $O_3/$FeOOH Process

1. Precursor complex formation $$\equiv Fe^{III}OH + O_3 -----\rangle \equiv Fe^{III}-OH-O_3$$

$$\equiv Fe^{III}OH + (M) \langle -----\rangle \equiv Fe^{III}-OH-M(\equiv M)$$

2. Electron transfer $$\equiv Fe^{III}-OH-O_3 -----\rangle \equiv Fe^{II}-O_2 + HO_2.$$

$$\equiv Fe^{II}-O_2 + H_2O -----\rangle \equiv Fe^{III}-OH + HO_2.$$

$$\equiv Fe^{II}-O_2 + .OH -----\rangle \equiv Fe^{III}-OH + O_2$$

3. Generation of hydroxyl radical $$O_3 + HO_2. -----\rangle .OH + 2\ O_2$$

4. Oxidation of organic compound $$.OH + \equiv M -----\rangle \equiv M_{oxi}$$

$$HO_2^-/.O_2^- + \equiv M -----\rangle \equiv M^*_{oxi}$$

The chemical oxidation of the organic compound using the metal oxide catalyst with either of the oxidizing agents is believed to occur primarily at the surface of the catalyst. The rate of decomposition, i.e., oxidation of the target organic compound, is likewise believed to be proportional to the surface concentration of the organic compound (at the catalyst surface), the surface concentration of the oxidizing agent, and the concentration, i.e., surface area, of the iron oxide catalyst. Consequently, the diffusion rates for migration of both the organic compound and the oxidizing agent to the catalyst surface are also important factors in the overall catalytic oxidation efficiency, so the reactor design, and other operating parameters selected, including catalyst packing depth, density and porosity, should be such as to maximize such diffusion mass transfer rates.

The surface area of the mineral oxide catalyst, where reference is made in this specification to surface area of the catalyst, includes not only the external surface area of the particulate catalyst but also the internal surface area of pores present in the particulate catalyst structure. The internal surface area provided by the pores structure of the mineral oxide catalyst is believed by the inventors to be involved in the catalyzed oxidation of the targeted organic compounds with the oxidizing agent. Consequently, the surface area provided by the presence of pores in the catalyst structure is an important factor in the catalytic oxidation process of this invention, rather than the external surface area of the catalyst alone.

Preliminary studies using the continuous catalytic oxidation process of this invention have demonstrated that substantially 80% to 90% mineralization of organic contaminants present in water can readily be accomplished using the process of this invention with goethite as the mineral oxide catalyst in a relatively short period of time, e.g., with residence times in the reactor being less than about 1 minute for a single stage fixed bed reactor. Consequently, these results indicate that essentially complete mineralization of organic contaminants present in water can be accomplished in a relatively straightforward manner in a single treatment utilizing the continuous catalytic oxidation process of this invention. Additional or subsequent treatment of the water or gas stream treated according to this invention is unnecessary since the removal of organic contaminants is essentially complete in this single treatment process.

The present invention will now be described and explained further, by reference to the following specific, illustrative, non-limiting Examples.

EXAMPLE 1

In this Example, water was artificially dosed with n-chlorobutane, and this contaminated water stream was subjected to catalytic oxidation with hydrogen peroxide in a single stage reactor containing a fixed bed of granular goethite as the catalyst.

The water was dosed with n-chlorobutane in an amount sufficient to provide a concentration of 7.4 ppm. Chlorobutane, also called n-butylchloride, is an organic compound that is particularly resistant to oxidation with hydrogen peroxide alone. N-chlorobutane is a model compound for chlorinated volative organic solvent compounds that are ubiquitous environmental contaminants.

The fixed bed reactor was a 1 cm inside diameter glass tube, 10 cm long. The reactor was operated in a continuous manner as a fixed bed plug flow reactor.

The granular goethite catalyst was catalyst-grade goethite, having a particle size (approximate diameter) in the range of about 0.3–0.6 mm (30–50 mesh) and a specific density of about 3 $g/cm^3$. The particulate goethite catalyst was obtained from Aldrich Chemical Company, Milwaukee, Wisconsin. The granular goethite catalyst was present in the reactor as a packed bed with a depth of 3 cm. Its packing density was about 1.25 $g/cm^3$, and packed bed porosity was about 0.6.

The oxidizing agent was aqueous hydrogen peroxide, containing about 35 wt % $H_2O_2$. The aqueous hydrogen peroxide was introduced at a rate sufficient to provide a concentration in the water being treated of 75 ppm $H_2O_2$. The hydrogen peroxide was added to the chlorobutane-contaminated water, prior to introduction of the water stream into the fixed bed reactor.

The chlorobutane-contaminated water stream, at a temperature of about 20°–25° C., was directed through the reactor in a down-flow direction at a flow rate of 6 ml/min, in a single pass treatment. The water loading rate was about 2 $gal/ft^2$·min (70 $l/m^2$·min). Residence time of the water being treated in the reactor was about 24 sec.

The treatment process was carried out continuously over a period of several days. During this time, periodic measurements were made to determine levels of n-chlorobutane, residual hydrogen peroxide and total organic carbon in the effluent water stream exiting from the reactor. The concentration of n-chlorobutane was analyzed by static head-space gas chromatography using pentyl chloride as an internal standard. Hydrogen peroxide concentration was determined by potassium permanganate titration. The total organic carbon concentration was measured with a Dohrman DC-80 carbon analyzer, according to a standard method.

These measurements indicated that about 90% of the n-chlorobutane originally present in the untreated water stream was consistently and rapidly removed by this catalytic oxidation treatment with hydrogen peroxide in a single pass through the goethite catalyst in the fixed bed reactor. Analyses of the effluent water stream indicated that about 80% of the hydrogen peroxide oxidizing agent was utilized during the catalytic oxidation treatment, resulting in a stoichiometric ratio of about 20 moles $H_2O_2$ consumed per mole n-chlorobutane.

COMPARATIVE EXAMPLE 1

A control was carried out for comparative purposes in which no hydrogen peroxide was used and the contaminated water stream was flowed through the reactor at a rate of 6.9 ml/min. In other respects, this control was the same as Example 1 described above in which hydrogen peroxide was used. In this control, only about 30% of the n-chlorobutane was removed from the treated water stream, as determined by measurements taken during the first hour. After about 80 hours of the continuous operation, the amount of n-chlorobutane being removed was negligible, and it appeared that the catalyst had become saturated with adsorbed n-chlorobutane and was incapable of effecting further adsorptive removal. By contrast, with hydrogen peroxide present (as in Example 1) to effect catalytic decomposition of the organic contaminant (rather than its mere adsorptive removal), the continuously operated reactor still provided effective removal and decomposition of the organic contaminant from the water stream after 100 hours of continuous operation.

EXAMPLE 2

The catalytic oxidation procedure of Example 1 was repeated, except that the amount of hydrogen peroxide was reduced to a concentration of 10 ppm (from 75 ppm in Example 1) and the flow rate was reduced to 3.3 ml/min (from 6 ml/min in Example 1). The fixed bed reactor was also operated in an up-flow direction in this Example (rather than down-flow as in Example 1).

Under these operating conditions, the continuous treatment in the fixed bed reactor decomposed and removed about 75% of the n-chlorobutane present in the water introduced to the reactor, over about 70 hours of continuous operation. Analysis of the effluent water stream indicated that about 95% of the hydrogen peroxide oxidizing agent was utilized during the catalytic oxidation treatment, resulting in a stoichiometric ratio of about 4 moles $H_2O_2$ consumed per mole n-chlorobutane.

The extent or degree of decomposition of the organic contaminant in the fixed bed reactor has been found to correlate directly with the extent of catalyzed decomposition of hydrogen peroxide. Studies of the decomposition of hydrogen peroxide as a function of flow rate of the aqueous solution passed through the fixed bed reactor have shown that reduced flow rates, i.e., increased average residence time in the reactor, results in a higher proportion of the oxidizing agent being utilized. The results of Examples 1 and 2 using two different flow rates are consistent with these other studies.

The decomposition of hydrogen peroxide has also been studied as a function of the depth of the packed catalyst bed in the reactor, and these studies have shown that increasing the depth of the packed bed results in a higher proportion of the oxidizing agent being utilized.

Other studies have been carried out to observe the catalytic activity of the goethite catalyst over long-term operation, using an upflow flow configuration in a packed bed column to eliminate gas accumulation on the packed catalyst. These studies have demonstrated no adverse change in the effectiveness of the catalyst over a 7-day period of continuous operation.

EXAMPLE 3

In this Example, air was artificially dosed with trichloroethylene, and this contaminated air stream was subjected to catalytic oxidation with ozone as the oxidizing agent in a single stage reactor containing a fixed bed of granular goethite as the catalyst.

The fixed bed reactor was identical to that utilized in Example 1, except that the bed depth was 6 cm (instead of 3 cm as in Example 1). The reactor was operated in a continuous manner as a fixed bed plug flow reactor. The catalyst was granular goethite, as in Example 1.

The oxidizing agent was ozone produced from oxygen with a Welsbach TO408 ozone generator. The ozone was introduced at a rate sufficient to provide a concentration in the air stream being treated of 20 mg/l. The ozone gas concentration in the influent gas stream and effluent gas stream was measured using a Spectronic-101 UV spectrophotometer, which was calibrated with the potassium iodide method. The ozone oxidizing agent gas stream and the air stream containing the trichloroethylene contaminant were each separately introduced to the fixed bed reactor at the base of the column reactor.

The contaminated air stream was compressed air stream that was dosed with trichloroethylene in an amount sufficient to provide a concentration of 10 ppm by volume. The trichloroethylene-contaminated air stream, at a temperature of about 20°–25° C., was directed through the reactor in an upflow direction at a flow rate of 200 ml/min., in a single pass treatment. Residence time of the air stream being treated in the reactor was about 1.5 sec.

The treatment process was carried out continuously over a period of four hours. During this time, periodic measurements were made to determine the levels of trichloroethylene and residual ozone in the effluent air stream exiting from the reactor. These analyses demonstrated that 95% of the trichloroethylene was oxidized by this single pass treatment and that the ozone was decomposed completely during this treatment, leaving no residual ozone in the effluent air stream.

The present invention may be embodied in other specific forms without departing from the spirit or essential attributes thereof and, accordingly, reference is made to the appended claims, rather than the foregoing specification, as indicating the scope of the invention.

We claim:

1. A process for treating a contaminated fluid comprising continuously introducing a fluid containing at least one organic contaminant into a reactor, contacting the fluid in the reactor with a particulate goethite catalyst in the presence of an oxidizing agent selected from the group consisting of hydrogen peroxide and ozone, for a period of contact time of the fluid in the reactor that averages less than about one hour, and continuously withdrawing an effluent stream of treated fluid, in which the amount of organic contaminant is reduced by at least about half in the effluent stream.

2. The process of claim 1 wherein the particulate catalyst has a median particle size in the range of about 10 microns to about 5 mm.

3. The process of claim 1 wherein the amount of oxidizing agent present is sufficient to provide a molar excess with respect to the amount of organic contaminant present.

4. The process of claim 1 wherein said period of contact time of the fluid in the reactor averages less than about thirty-minutes.

5. The process of claim 1 wherein the fluid in the reactor is maintained at a temperature within the range of about 10° C. to about 50° C.

6. The process of claim 1 wherein the amount of organic contaminant in the fluid is reduced by at least about 80% in the effluent stream.

7. The process of claim 1 wherein the amount of organic contaminant in the fluid is reduced by at least about 90% in the effluent stream.

8. The process of claim 1 wherein the organic contaminant in the fluid is essentially completely mineralized in the effluent stream.

9. The process of claim 1 wherein the reactor is selected from the group consisting of fixed bed reactors, semifluidized bed reactors, fluidized bed reactors and continuous stirred tank reactors.

10. The process of claim 1 wherein the reactor is a multistage reactor or at least two reactors connected in series.

11. The process of claim 1 wherein the organic contaminant is selected from the group consisting of chlorinated alkanes, chlorinated alkenes, alkanes, alkenes, aromatics, ketones, alcohols, carboxylic acids, amines and ethers.

12. The process of claim 1 wherein the contaminated fluid further contains at least one metal selected from the group consisting of arsenic, lead, copper, cadmium, nickel, zinc, mercury and selenium.

13. The process of claim 1 wherein the fluid is a liquid aqueous medium.

14. The process of claim 13 wherein the organic contaminant is present in an amount of less than about 5% by weight.

15. The process of claim 13 wherein the aqueous medium has a pH within the range of about 5 to about 9.

16. The process of claim 13 wherein the aqueous medium is selected from the group consisting of an aqueous industrial waste stream, groundwater, surface water and seawater.

17. The process of claim 13 wherein the aqueous medium contains bromide.

18. The process of claim 1 wherein the fluid is a gas stream.

19. The process of claim 18 wherein the organic contaminant is present in an amount of less than about 1% by volume of the fluid.

* * * * *